United States Patent [19]
Ruffle et al.

[11] 3,712,399
[45] Jan. 23, 1973

[54] BATTERY POWER CONTROL DEVICE

[75] Inventors: William H. Ruffle; Brian C. Hemsley, both of Hassocks, England

[73] Assignee: C. Dugard Limited, Hove, Sussex, England; by said Hemsley, a part interest

[22] Filed: July 13, 1970

[21] Appl. No.: 54,351

[52] U.S. Cl. ............................180/19 R, 180/65 R
[51] Int. Cl. ...............................B62d 51/04
[58] Field of Search .......180/19 H, 19 S, 14 D, 65 R, 180/19 R; 338/101, 108, 111, 113

[56] References Cited

UNITED STATES PATENTS

| | | | |
|---|---|---|---|
| 2,879,858 | 3/1959 | Thomas | 180/19 H |
| 1,942,637 | 1/1934 | Best | 180/14 D |
| 3,090,459 | 5/1963 | Scudder | 180/19 R |
| 3,291,243 | 12/1966 | Friesser | 180/19 R |
| 2,937,706 | 5/1960 | Chandler | 180/19 H |

Primary Examiner—Kenneth H. Betts
Assistant Examiner—John A. Pekar
Attorney—Polachek, Saulsbury & Hough

[57] ABSTRACT

An electric power control means for a vehicle includes a stack of carbon plates in the power supply circuit of the vehicle and means for applying pressure to said plates in accordance with the torsional stress in the vehicle transmission, the electric power being proportional to the pressure applied to the carbon plates so that the power is controlled in accordance with the requirements of the vehicle.

2 Claims, 5 Drawing Figures

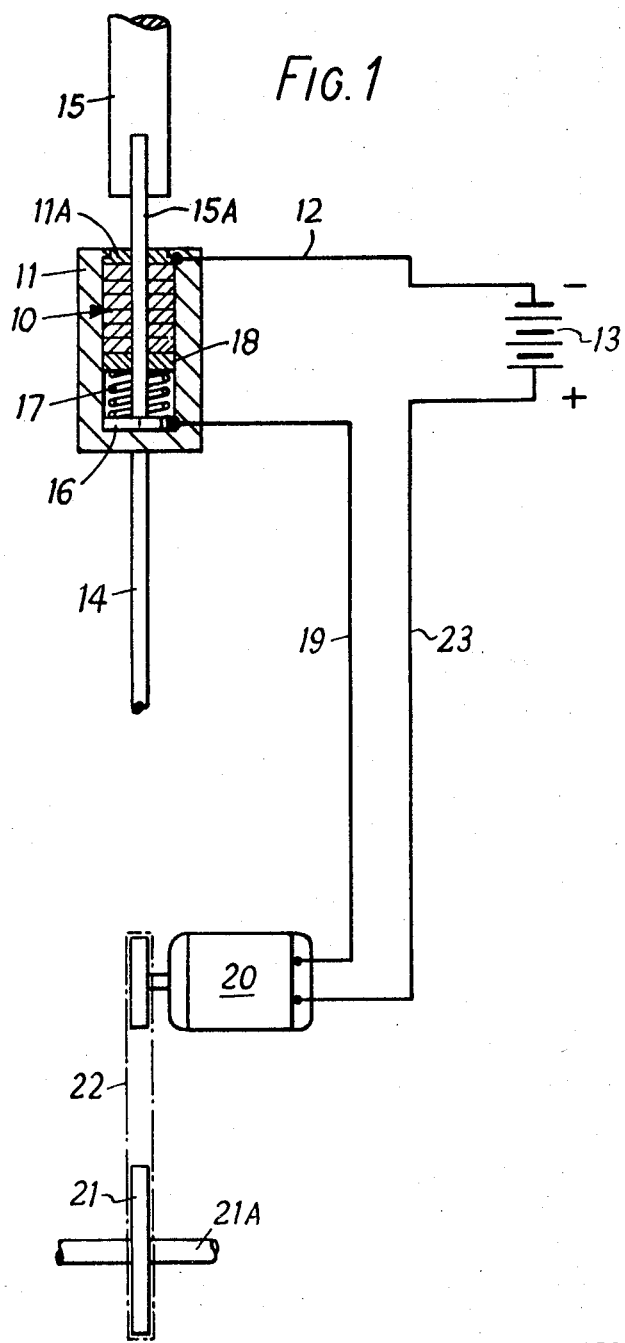

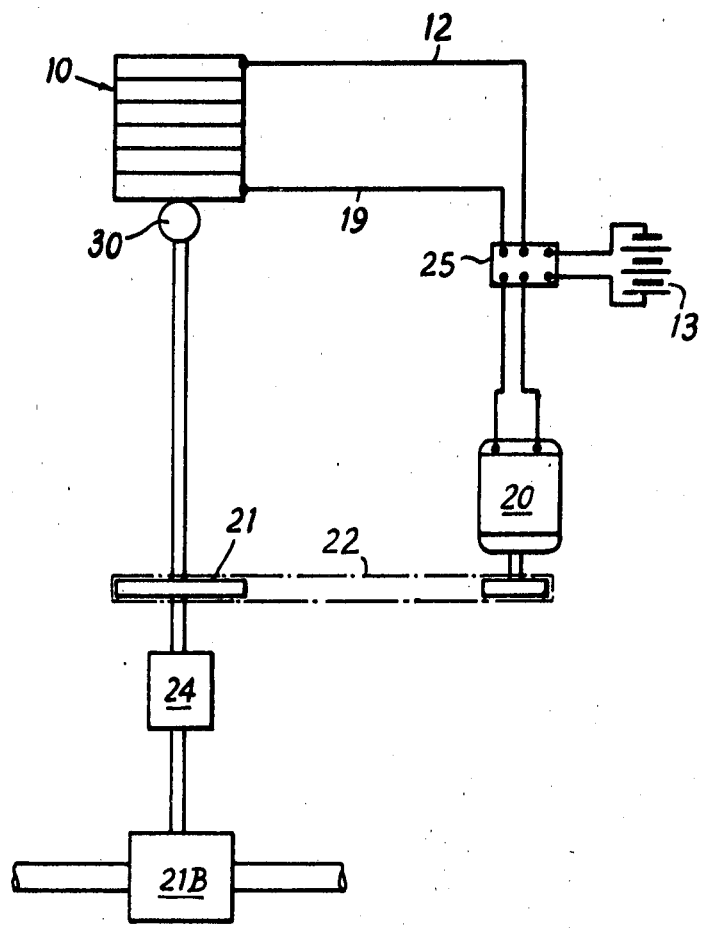

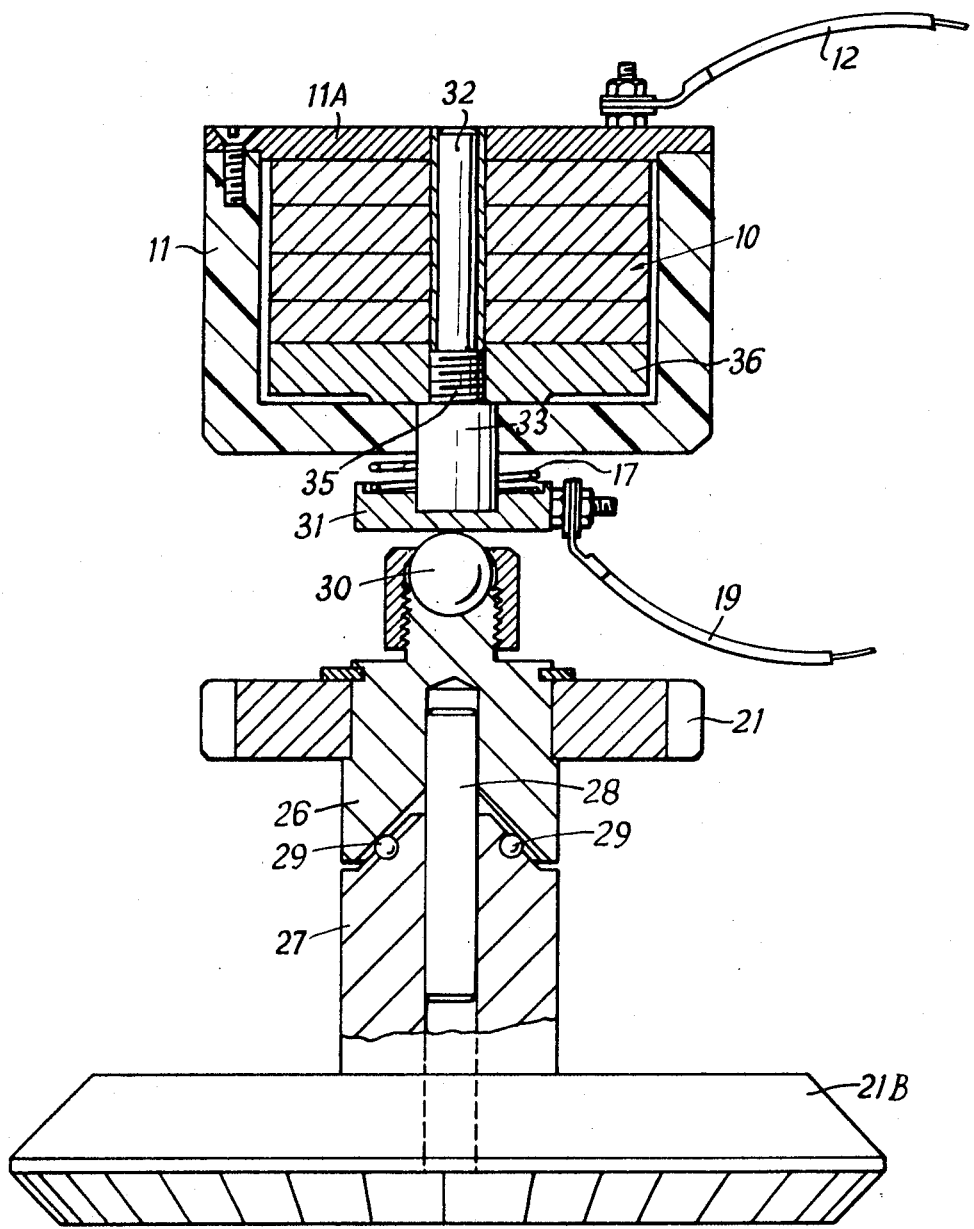

INVENTORS
WILLIAM HARRY RUFFLE
BRIAN CHARLES HEMSLEY

BATTERY POWER CONTROL DEVICE

Numerous forms of electric power control devices are known, but many disadvantages are incurred for various reasons; for example, the effective control may vary in steps or lack sensitivity, or the device may be complex. It is an object of the present invention to provide an electric power control device, particularly for the control of battery-powered vehicles in which the above disadvantages are at least partly removed and which results in efficient use of the power supply; this efficiency has the very desirable effect of conserving battery power in battery-powered vehicles.

According to the present invention there is provided in a electrically driven vehicle, electric power control means including a variable resistance in the power supply circuits of the vehicle provided by a stack of carbon plates and means for applying pressure to the stack to thereby alter the resistance of said stack, the electric power being proportional to said resistance.

The benefits of the present invention will be understood more clearly in the light of a description of a particular embodiment thereof, to be described hereafter.

Referring to the drawings:

FIG. 1 is a diagram showing a control system for a pedestrian-controlled vehicle;

FIG. 2 is a diagram showing a control system for a driver-carrying vehicle;

FIG. 3 is a detail section of a torque translator suitable for use in the control system of FIG. 2.

Figure 4A:
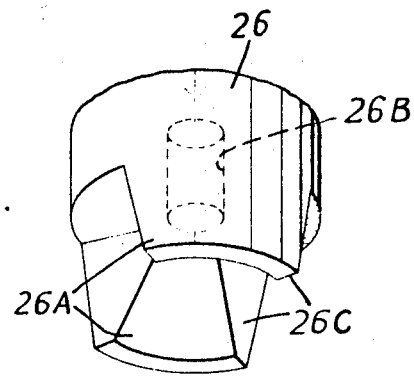
FIG. 4A is a perspective view of a portion of part 26 in FIG. 3.
Figure 4B:
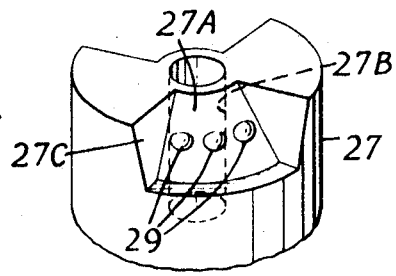
FIG. 4B is a perspective view of a portion of part 27 in FIG. 3.

The holder 11 is attached to the vehicle (not shown) by a shaft 14 and a handle 15 extends from the leading end of the holder. Inner part 15A of the handle 15 extends through the stack of discs 10 and carries a conductive end abutment plate 16, and a compression spring 17 extends between the plate 16 and a conductive cap 18 at the end of the stack.

The plate 16 is connected, through line 19, to an electric motor 20 which drives pinton 21 on rear axle shaft 21A through a chain drive 22. The motor 20 is also connected, through line 23, to the positive terminal of the battery 13.

It will thus be appreciated that the stack of carbon discs 10 constitutes a variable resistor in the electrical circuit which interconnects the battery 13 and the electric motor 20. Actuation of the handle 15 varies the pressure applied to the stack 10 and, more specifically, a pull on the handle will increase the pressure and so reduce the electrical resistance of the stack. Thus, when the handle 15 is pulled by the operator of the vehicle, driving torque is exerted by the motor 20, and this torque will be reduced when the vehicle begins to overtake the operator whereupon the pull on the handle will decrease.

The embodiment described in relation to FIG. 1 is particularly suitable for use in, for example, powered golf trolleys or milk-floats which are, of course, pedestrian controlled.

The embodiment shown in FIGS. 2 and 3 is similar to the above and like parts are indicated by corresponding references. In this second embodiment, however, pressure is applied to the stack of carbon discs 10 by means of a torque translator 24 which is incorporated in the drive from motor 20 to differential wheel 21B and which is shown in detail in FIG. 3.

Referring now to FIG. 3, sprocket 21 is driven by the motor 20 which is equipped with a starting and reversing switch, sprocket 21 being carried upon shaft length 26. The end of shaft length 26 distant from said sprocket has two arcuate annular frusto-conical tapering dogs 26A, each dog having two sloping faces 26C engageable with similar sloping faces 27C on shaft length 27 which shaft length has two recesses 27A adapted to receive said dogs 26A. When the motor is started the length 26 is turned, the differential wheel 71B and its associated shaft length 27 are initially stationary and thus, due to relative rotation between lengths 26 and 27, which lengths are axially aligned by means of bores 26B, 27B, and arbor 28, and due to sliding friction between the faces 26C and 27C dogs 26A roll over ball-bearings 29 carried by length 27 and cause the length 26 to move axially away from length 27.

It will, therefore, be appreciated that, as sprocket 21 turns relative to differential wheel 21B, plate 36 exerts pressure on the stack 10 which is supported by end plate 11A, to increase the current supplied to the motor 20. Thus, on starting, a heavy current is supplied to the motor but as the load in the drive decreases the stack 10 approaches open circuit and the power supply is reduced.

This embodiment is applicable to battery powered passenger-carrying vehicles and, for example, when such a vehicle runs downhill, assitance from the motor may not be required and any excess power can be derived from the motor, as in regenerative braking, to recharge the batteries.

In any case this simple and inexpensive device ensures that only the minimum current is used, as the power available by the weight of the vehicle on a down gradient, however slight, is deductable from the current used.

It will be appreciated, of course, that over-riding pedal-operated controls may also be provided.

What is claimed is:

1. In an electrically driven vehicle, electric power control means including a variable resistance in the power supply circuits of the vehicle provided by a stack of carbon plates and means for applying pressure to the stack to thereby alter the resistance of said stack, the electric power being proportional to said resistance, including a battery connected to provide said electric power, a driving motor and driving wheels mounted operatively on said vehicle, a torque translator incorporated in a drive from the drive motor of the vehicle to the driving wheels of the vehicle and said torque translator including means for producing a movement which is dependent upon the torque being transmitted for applying pressure to said stack such that it is controllable of the electric power delivered to the driving motor of the vehicle.

2. In an electrically driven vehicle, electric power control means as claimed in claim 1, in which a spring is provided to oppose said pressure and urge said stack to a substantially open-circuit state.

* * * * *